(12) United States Patent
Vo et al.

(10) Patent No.: US 9,272,672 B2
(45) Date of Patent: Mar. 1, 2016

(54) REAR LOADED INTERIOR BADGE

(71) Applicant: Ford Global Technologies, LLC, Dearborn, MI (US)

(72) Inventors: Tien Vo, Truganina (AU); Jacob Alexander, Greenvale (AU); Prakash Babu, Yallambie (UA)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 14/284,544

(22) Filed: May 22, 2014

(65) Prior Publication Data

US 2015/0336517 A1    Nov. 26, 2015

(51) Int. Cl.
*B60R 13/00* (2006.01)
*B60R 13/02* (2006.01)
*G09F 3/02* (2006.01)

(52) U.S. Cl.
CPC .............. *B60R 13/005* (2013.01); *B60R 13/02* (2013.01); *G09F 2003/0208* (2013.01)

(58) Field of Classification Search
CPC ........................... B60R 13/005; B60R 13/002
See application file for complete search history.

(56) References Cited

U.S. PATENT DOCUMENTS

| | | | |
|---|---|---|---|
| 4,691,457 A | 9/1987 | Peroni | |
| 4,830,892 A | 5/1989 | Nussbaum | |
| 5,641,221 A * | 6/1997 | Schindele | B60R 13/02 315/84 |
| 5,736,233 A * | 4/1998 | Fye | B32B 38/10 101/491 |
| 6,416,844 B1 * | 7/2002 | Robson | B44C 1/228 427/164 |
| 6,581,311 B1 | 6/2003 | Davey et al. | |
| 6,892,485 B2 * | 5/2005 | Geyer | G09F 13/04 362/806 |
| 7,162,821 B2 * | 1/2007 | Venkataraman | G09F 13/04 40/541 |
| 7,677,650 B2 | 3/2010 | Huttenlocher | |
| 8,181,372 B2 | 5/2012 | Osiecki et al. | |
| 8,266,833 B2 | 9/2012 | Pierce et al. | |
| 8,277,588 B2 | 10/2012 | Goodrich et al. | |
| 8,381,423 B2 | 2/2013 | Pierce et al. | |
| 8,480,503 B2 | 7/2013 | Wilbur et al. | |
| 2003/0000863 A1 * | 1/2003 | Lee | B25H 3/02 206/459.5 |
| 2004/0231211 A1 | 11/2004 | Johnson | |
| 2005/0213351 A1 * | 9/2005 | Yang | B60Q 1/323 362/633 |
| 2012/0320615 A1 * | 12/2012 | Englert | B60Q 1/323 362/511 |
| 2013/0107046 A1 | 5/2013 | Forgue | |

FOREIGN PATENT DOCUMENTS

| | | |
|---|---|---|
| CA | 2814289 | 12/2013 |
| EP | 0965489 | 12/1999 |
| EP | 1362749 | 11/2003 |

* cited by examiner

*Primary Examiner* — Gary Hoge
(74) *Attorney, Agent, or Firm* — Vichit Chea; Price Heneveld LLP

(57) ABSTRACT

A badge mounting system for a vehicle interior includes a badge plate and an emblem or badge comprised of raised lettering or a design that is formed integrally on the badge plate. A trim panel includes inner and outer surfaces and a badge relief section formed integrally on the trim panel. The badge relief section is defined by letter shaped apertures. The badge plate is coupled to the inner surface of the trim panel and the emblem is received in the badge relief section in assembly. The badge plate is rear loaded to the trim panel and the system may include more than one badge plate. In assembly, a portion of the badge extends outwardly from the outer surface of the trim panel through the badge relief section.

16 Claims, 4 Drawing Sheets

REAR LOADED INTERIOR BADGE

FIELD OF THE INVENTION

The present invention generally relates to a mounting system for an interior badge, and more specifically, to a mounting system for a rear loaded interior badge for use in a vehicle.

BACKGROUND OF THE INVENTION

Commonly, front loaded badge mounting systems have been used in many industries, especially in the automotive industry for exterior badge applications. For vehicle interiors, however, the adhesive of these front loaded badges on painted plastics have proven to be less durable or robust than desired. The present invention provides a rear loaded badge mounting system which includes reinforcement features for lettering used in the badge, thereby providing the proper aesthetic and part durability desired in a badge display.

SUMMARY OF THE INVENTION

One aspect of the present invention includes a badge mounting system for a vehicle interior having a trim panel with inner and outer surfaces and letter shaped apertures disposed through a body portion of the trim panel. One or more badge plates are rear loaded to the inner surface of the trim panel and include raised lettering defining a badge. The badge is received in the letter shaped apertures of the trim panel in assembly.

Another aspect of the present invention includes a badge mounting system for a vehicle interior having a badge plate and an emblem comprised of raised lettering formed integrally on the badge plate. A trim panel includes inner and outer surfaces and a badge relief section formed integrally on the trim panel. The badge relief section is defined by letter shaped apertures. The badge plate is coupled to the inner surface of the trim panel and the emblem is received in the badge relief section in assembly.

Yet another aspect of the present invention includes a badge mounting system for a vehicle interior having a badge plate with a backing portion and a raised badge portion integrally formed on the backing portion. A trim panel includes inner and outer surfaces and a badge relief section integrally formed through the trim panel. The badge relief section has a complementary configuration to the raised badge portion, and is configured to receive the raised badge portion when the badge plate is coupled to the inner surface of the trim panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
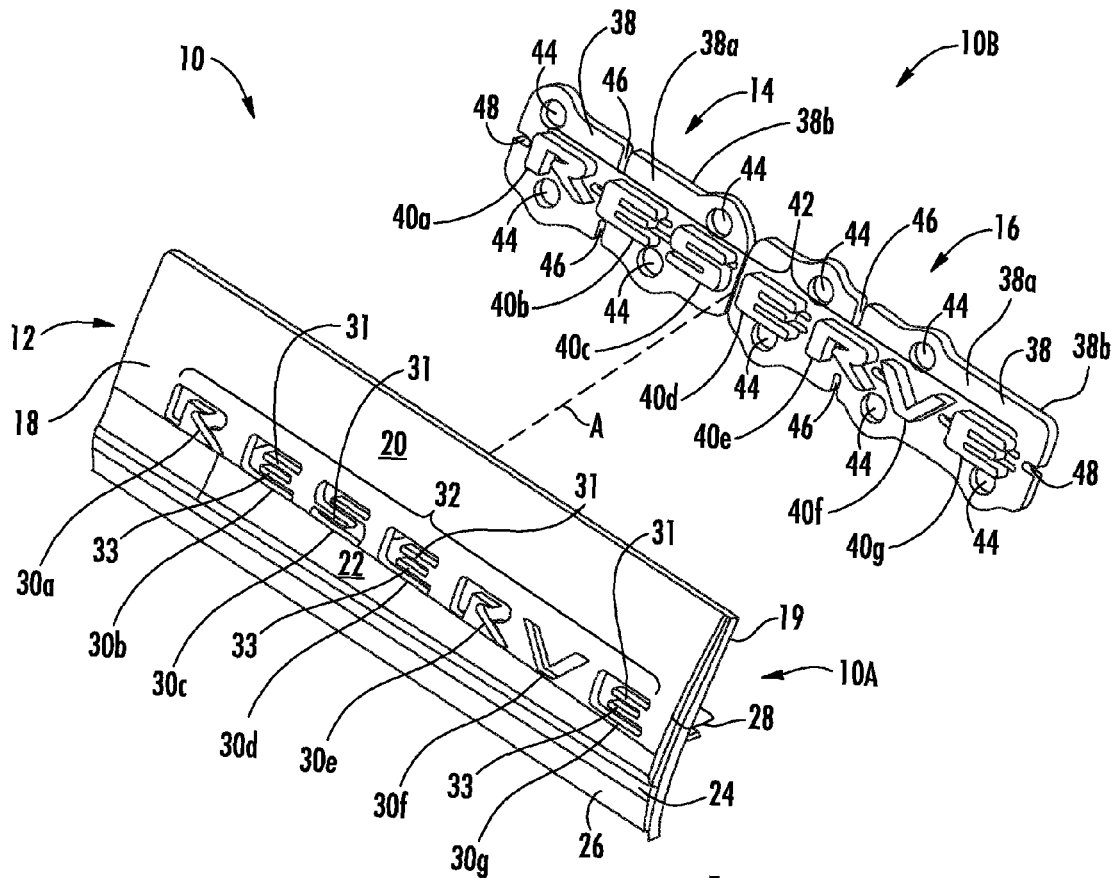
FIG. 1 is a top perspective view of a trim panel in first and second badge plates.

For purposes of description herein, the terms "upper," "lower," "right," "left," "rear," "front," "vertical," "horizontal," and derivatives thereof shall relate to the visor and lighting assembly as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a badge mounting system which includes a trim panel 12 and first and second badge plates 14, 16. The trim panel 12 is a decorative panel which includes an outer surface or A-side 18 at an inner surface or B-side 19. The trim panel 12 may be substantially planar, or may be curved to fit a configuration of a vehicle dashboard. In the embodiment shown in FIG. 1, the A-side 18 includes a number of outer surface sections 20, 22, 24 and 26 which may be comprised of various materials to provide a decorative appearance to the trim panel 12. For example, upper surface 20 may include a polymeric skin having an embossed pattern configured to resemble a leather covering. Surface sections 22, 26 may be polymeric surfaces that have an embossed pattern, or perhaps a piano black finish with surface section 24 being a chrome-plated surface disposed therebetween. One of ordinary skill in the art will appreciate that several different variations can be used for the surface sections 20-26 to form any variety of decorative configurations for the A-side or outer surface 18 of trim panel 12. As further shown in FIG. 1, the trim panel 12 is a substantially planar trim panel which includes a series of individual letter shaped apertures 30a-30g, which are disposed through a body portion 28 of the trim panel 12. The body portion 28 of the trim panel 12 defines a thickness thereof, through which the series of individual letter shaped apertures 30a-30g are disposed through. The series of individual letter shaped apertures 30a-30g define a badge relief section 32, such that the trim panel 12 defines a female side 10A of the badge mounting system 10. As further shown in FIG. 1, the badge relief section 32 defines a letter shaped aperture arrangement corresponding to the lettering RESERVE. While the trim panel 12 includes a badge relief section 32 with individual letter shaped apertures 30a-30g spelling out the word RESERVE in negative space, it is contemplated that any arrangement of letter shaped apertures can be used with the present invention for providing a female side of a badge mounting system. In FIG. 1, the individual letter shaped apertures 30a-30g correspond to the following letters 30a (R); 30b (E); 30c (S); 30d (E); 30c (R); 30f (V); 30g (E).

Referring again to FIG. 1, the first and second badge plates 14, 16 are shown exploded away from trim panel 12. Each badge plate 14, 16 includes a generally planar backing portion 38 having a plurality of individual letters 40a-40g which define letter shaped protrusions or raised lettering extending outwardly from the planar backing portion 38. The backing portion 38 of the badge plates 14, 16 includes an abutment surface 38a and a rear surface 38b. As shown, the plurality of individual letters 40a-40g extending outwardly from the abutment surface 38a of the generally planar backing portion 38 to define a badge 42 to be horizontally received in the badge relief section 32 of the trim panel 12 along the path indicated by dotted line A. In this way, the first and second badge plates 14, 16 are rear loaded to the inner surface 19 of the trim panel 12 of the female side 10A of the badge mounting system 10, such that the first and second badge plates 14, 16 define a male side 10B to the badge mounting system 10. As further shown in FIG. 1, the badge 42 comprises the individual letters 40a-40g which define raised lettering spelling the term RESERVE, such that the badge 42 is configured to closely fit within the badge relief section 32 of the trim panel 12. In FIG. 1, the individual letter shaped apertures 40a-40g correspond to the following letters 40a (R); 40b (E); 40c (S); 40d (E); 40c (R); 40f (V); 40g (E), with "RES" on badge plate 14, and "ERVE" on badge plate 16. Thus, the badge 42 defines a raised badge portion of badge plates 14, 16 having alphanumeric indicia configured in an emblem. While the first and second badge plates 14, 16 shown in FIG. 1 have raised alphanumeric indicia, it is contemplated that the badge plates 14, 16 may be used to carry a design or symbol for display in a vehicle interior. While the first and second badge plates 14, 16 shown in FIG. 1 are individual and separate plates, it is contemplated that a unitary plate can be used with the present invention without departing from the spirit of the invention. In such an embodiment, a singular badge plate would include a generally planar body portion having lettering raised therefrom which is adapted to fit into the corresponding badge relief section of a trim panel.

Referring again to FIG. 1, the first and second badge plates 14, 16 each include mounting apertures 44 which are disposed above and below the badge 42. Further, vertical locating notches 46 are disposed above and below the badge 42, while horizontal locating notches 48 are disposed on right and left sides of the badge 42. The mounting apertures 44 and locating notches 46, 48 define locating features which are used to properly position the first and second badge plates 14, 16 in proper alignment with the trim panel 12 in assembly. These locating features 44, 46, 48 provide for quick positioning of the badge plates 14, 16 on trim panel 12. These locating features 44, 46, 48 provide a positive locating arrangement with associated locating features disposed on the trim panel 12 as further described below. Such locating features are important when the individual letters 40a-40g are configured to closely fit within the letter shaped apertures 30a-30g of the trim panel 12. While the individual letters 40a-40g are described as "individual", it is contemplated that a scroll-type font can be employed for providing a badge with continuous and interconnected lettering on the male side 10B of the badge mounting system 10. Further, as used herein, the terms "badge" and "emblem" describe a display which includes a term that is relative to the vehicle in which the badge or emblem is disposed. As such, the lettering can convey a name for the car, the manufacturer of the car, a model of the car, or any other like information for which an interior design team believes to be suitable for display within a vehicle interior.

Figure 2:
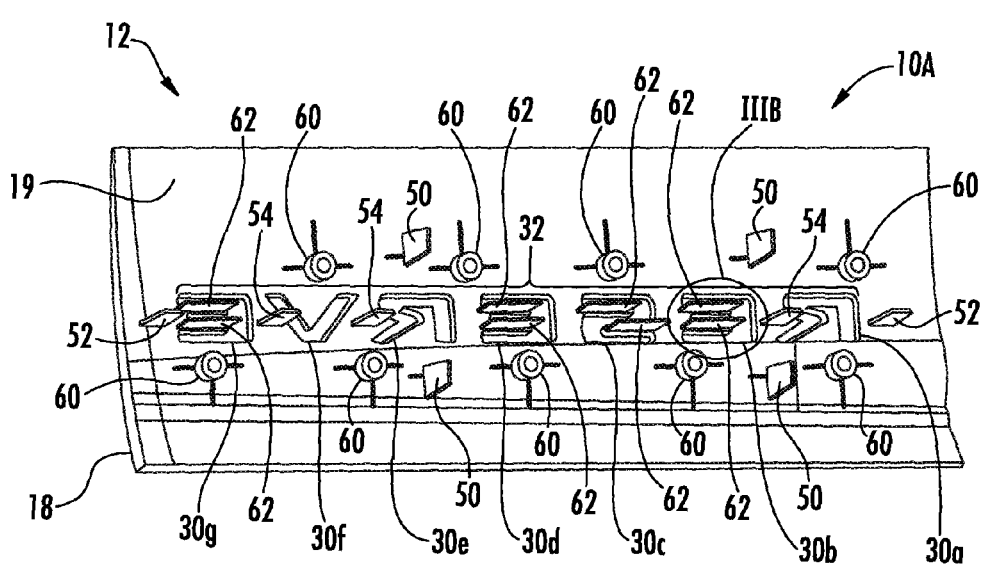
FIG. 2 is a rear perspective view of the trim panel of FIG. 1.

Referring now to FIG. 2, the B-side or inner surface 19 of trim panel 12 is shown having the badge relief section 32 disposed therethrough. The B-side or inner surface 19 is also a generally planar side having vertical locating tabs 50 extending outwardly therefrom. The vertical locating tabs 50 are disposed above and below the badge relief section 32 in the embodiment shown in FIG. 2. As further shown in FIG. 2, horizontal locating tabs 52 are disposed on opposite ends of the badge relief section 32. In assembly, the locating tabs 50, 52 are associated with the locating notches 46, 48 of the first and second badge plates 14, 16, such that the locating tabs 50, 52 cooperate with the locating notches 46, 48 to properly place the first and second badge plates 14, 16 on the inner surface 19 of the trim panel 12. As further shown in FIG. 2, intermediate locating tabs 54 are disposed within the badge relief section 32 between letter relief sections 30e, 30d and 30b, 30c. Thus, it is contemplated that intermediate locating tabs, such as intermediate locating tabs 54, can be placed along the badge relief section 32 for aid in locating the first and second badge plates 14, 16 to the trim panel 12.

Referring again to FIG. 2, a plurality of mounting bosses 60 are shown as being raised from the generally planar inner surface 19 of trim panel 12. In assembly, the mounting bosses 60 are adapted to be received in the mounting apertures 44 disposed on the first and second badge plates 14, 16. It is contemplated that the mounting bosses 60 can be frictionally fit within the mounting apertures 44 of the first and second badge plates 14, 16, such that as received therein, the mounting pegs 60 will positively retain the mounting plates 14, 16 on the trim panel 12. As the mounting plates 14, 16 are loaded from the B-side or inner surface 19 of the trim panel 12, the badge mounting system 10, as shown in FIG. 1, is a rear loaded badge mounting system. The mounting bosses 60 are generally tubular members that can be used to couple the trim panel 12 to the pins or fasteners disposed on dashboard structural reinforcements. As further shown in FIG. 2, reinforcement members 62 in the form of outwardly extending tabs or ribs are disposed at various locations within the badge relief section 32 for reinforcing portions of the badge relief section 32 that may be prone to breakage or misalignment in assembly. In this way, the reinforcement members 62 provide for specific portions of the individual letter shaped apertures 30a-30g to have sufficient support necessary to function properly in assembly as shown in particular with individual letter shaped apertures 30b, 30d, and 30g which include relief portions having a general E-shaped cutout image, as well as 30c which includes a relief portion having a generally S-shaped cutout image. The reinforcement members 62 are generally comprised of integrally molded plastic ribs which extend approximately 5 mm or less outwardly from the inner surface 19 of the trim panel 12. The coupling of the trim panel 12 and first and second badge plates 14, 16 is further described below with reference to FIGS. 3A-3C, wherein the positioning of the reinforcement members 62 is better shown.

Figure 3A:
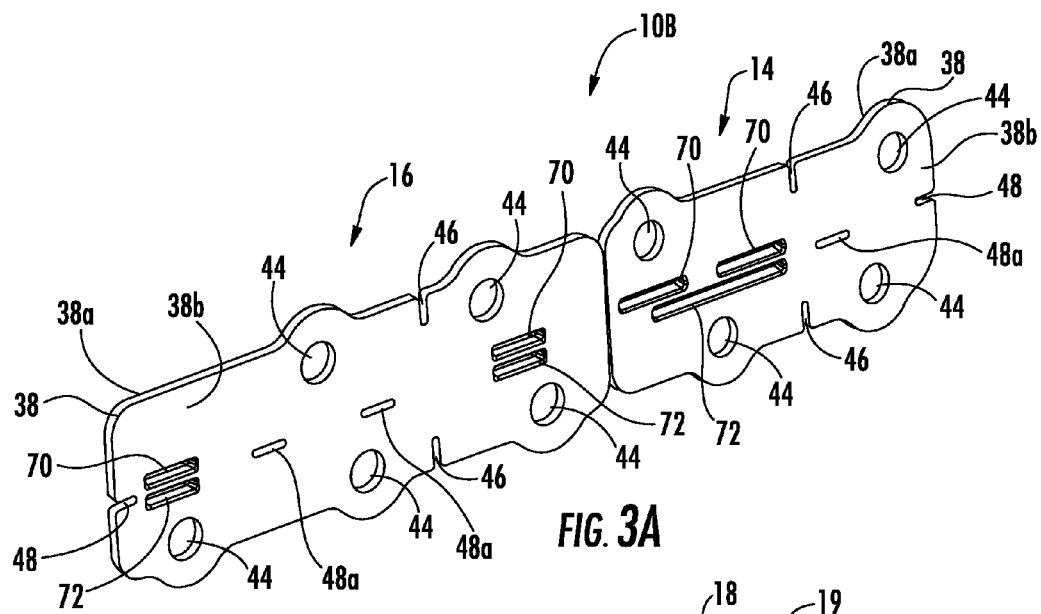
FIG. 3A is a rear perspective view of the first and second badge plates of FIG. 1.

Referring now to FIG. 3A, the first and second badge plates 14, 16 are shown from the rear surface 38b of the backing portion 38. The mounting apertures 44, vertical locating notches 46 and horizontal locating notches 48 are shown disposed through the backing portion 38. As further shown in the embodiment of FIG. 3A, horizontal locating notches 48a are also disposed through the backing portion 38 and are adapted to receive the intermediate locating tabs 54 in assembly. As noted above, the intermediate locating tabs 54 can be placed along the badge relief section 32 of the trim panel 12 for aiding in locating the first and second badge plates 14, 16 to the inner surface 19 of the trim panel 12. As further shown in the embodiment of FIG. 3A, reinforcement apertures 70, 72 are also horizontally disposed through the backing portion 38 and are adapted to receive the outwardly extending reinforcement members 62 of the trim panel 12 in assembly. The reinforcement apertures 70, 72 and reinforcement members 62 are configured on the trim panel 12 and badge plates 14, 16, respectively, to reinforce specific portions of the badge 42 and relief section 32. Particularly, in the embodiment of FIG. 1, lettering flange portions 31, 33 are incorporated into the image cutouts 30b, 30d, and 30g which include relief portions having a general E-shaped cutout image, as well as 30c which includes a relief portion having a generally S-shaped cutout image. The lettering flange portions 31, 33 define flanges which are relatively susceptible to breakage given the overall configuration of the relief sections or image cutouts associated with particular letters. In this case, the image cutouts for E-shaped and S-shaped letters make for lettering flange portions 31, 33, however, it is contemplated that any image cutout could include a lettering flange portion that needs extra support for improved durability. In the embodiment shown in FIG. 1, it is contemplated that the lettering flange portions 31, 32 may be 2 mm or less in thickness.

Figure 3B:
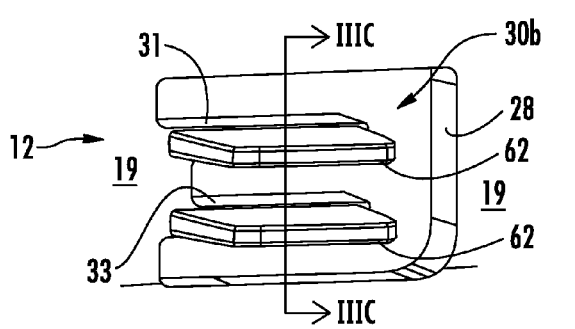
FIG. 3B is a fragmentary view of the rear side of the trim panel of FIG. 2 taken at location IIIB.
Figure 3C:
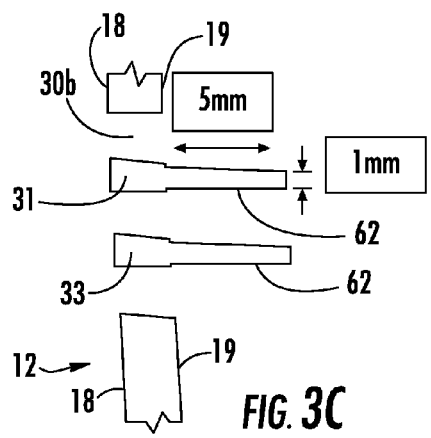
FIG. 3C is a cross-sectional view of the trim panel taken at line IIIC of FIG. 3B.

Referring now to FIG. 3B, E-shaped aperture 30b is shown having upper and lower lettering flange portions 31, 33. Outwardly extending from the lettering flange portions 31, 33 are reinforcement members 62 which, as noted above, are adapted to reinforce the upper and lower lettering flange portions 31, 33 in assembly. In FIG. 3B, E-shaped aperture 30b of trim panel 12 is exemplified, however, it is contemplated that any letter shaped aperture resulting in a lettering flange portion may be used to demonstrate the functionality of the reinforcement members 62. In a cross-sectional view shown in FIG. 3C, E-shaped aperture 30b is shown having three cutout portions corresponding to the overall configuration necessary to receive the raised letter "E" 40b shown in FIG. 1. In FIG. 3C, the reinforcement members 62 are shown extending outwardly approximately 5 mm from the lettering flange portions 31, 33 with a thickness of about 1 mm. Thus, for the letters "E" and "S", as used with the present badge mounting system 10, the reinforcement members 62 reinforce the structure from behind the lettering flange portions 31, 33 also for plastic moldflow reasons. Without the support provided by the reinforcement members 62, the lettering flange portions 31, 33 would likely warp or otherwise become misaligned and therefore would not deliver the craftsmanship required for the badge mounting system 10.

Figure 3D:
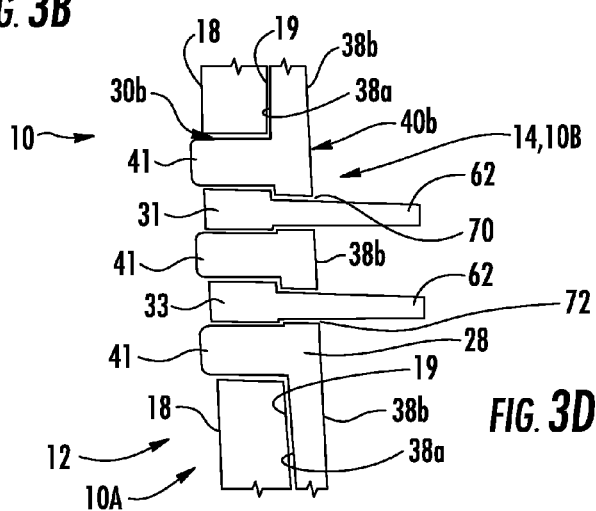
FIGS. 3D-3F are cross-sectional views of the trim panel of FIG. 3C in a coupled arrangement with different embodiments of a badge plate.
Figure 3E:
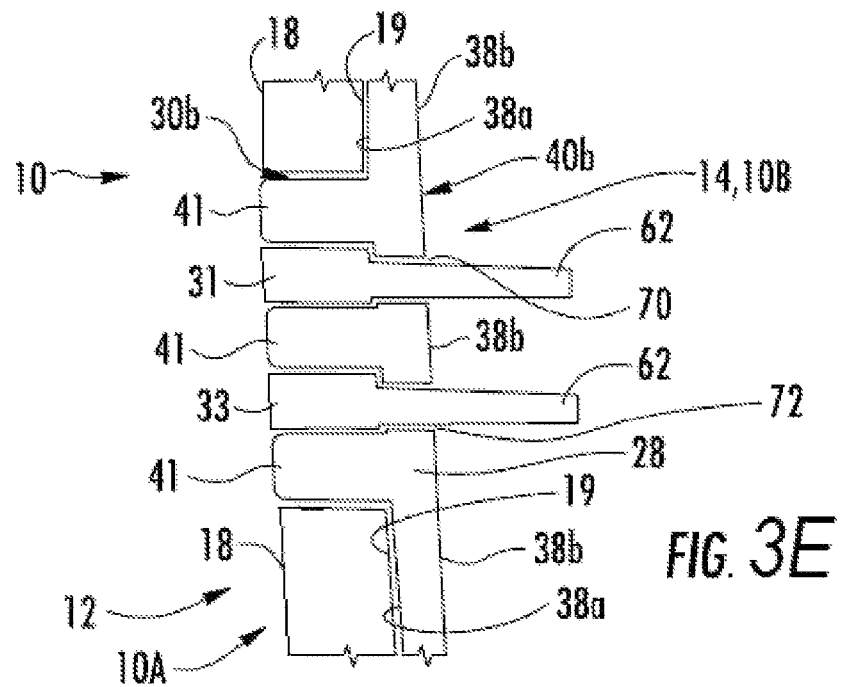
Figure 3F:
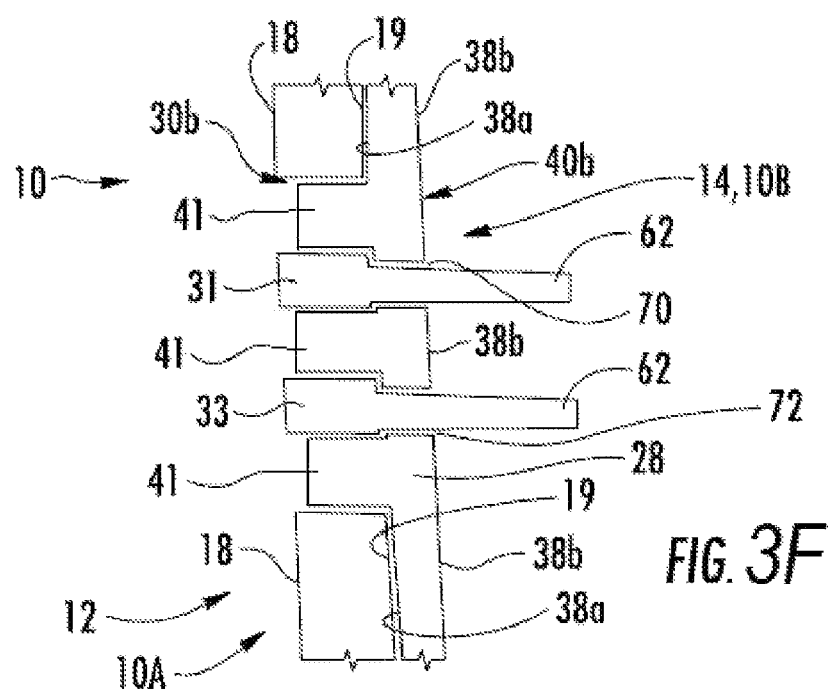

Referring now to FIG. 3D, badge plate 14 is coupled to the trim panel 12 at raised lettering 40b and letter shaped aperture 30b respectively. In the embodiment shown in FIG. 3D, it is clear that the badge plate 14 is rear loaded to the trim panel 12, such that the badge plate 14 defines a male side 10B to the female side 10A of the trim panel 12 of the badge mounting system 10. As further shown in FIG. 3D, abutment surface 38a of backing portion 38 of badge plate 14 abuts inner surface 19 of the trim panel 12 in assembly. This abutment is shown at the upper and lower lettering flange portions 31, 33 as well. The reinforcement members 62 of the trim panel 12 are shown extending through the reinforcement apertures 70, 72 disposed through the badge plate 14. Thus, in assembly, the reinforcement apertures 70, 72 are disposed adjacent to the lettering flange portions 31, 33 for receiving the reinforcement members 62 therethrough. As further shown in FIG. 3D, the raised lettering 40b for the letter "E" includes distal end portions 41 which are configured in assembly to extend beyond the outer surface 18 of the trim panel 12. In this way, the distal end portions 41 are proud or outboard of the outer surface 18 of the trim panel 12 which, in this embodiment, is deemed to be an approximate 2 mm extension from the outer surface 18 of the trim panel 12. In this way, the distal end portions 41 provide a 3-D effect to the badge 42 as received in the trim panel 12. It is further contemplated that the distal end portions 41 may be flush, or substantially flush, with the outer surface 18 of the trim panel 12 as shown in FIG. 3E, or the distal end portions 41 may be recessed relative to the outer surface 18 of the trim panel 12, as shown in FIG. 3F, for providing any number of desired effects for the overall badge configuration.

Figure 4:
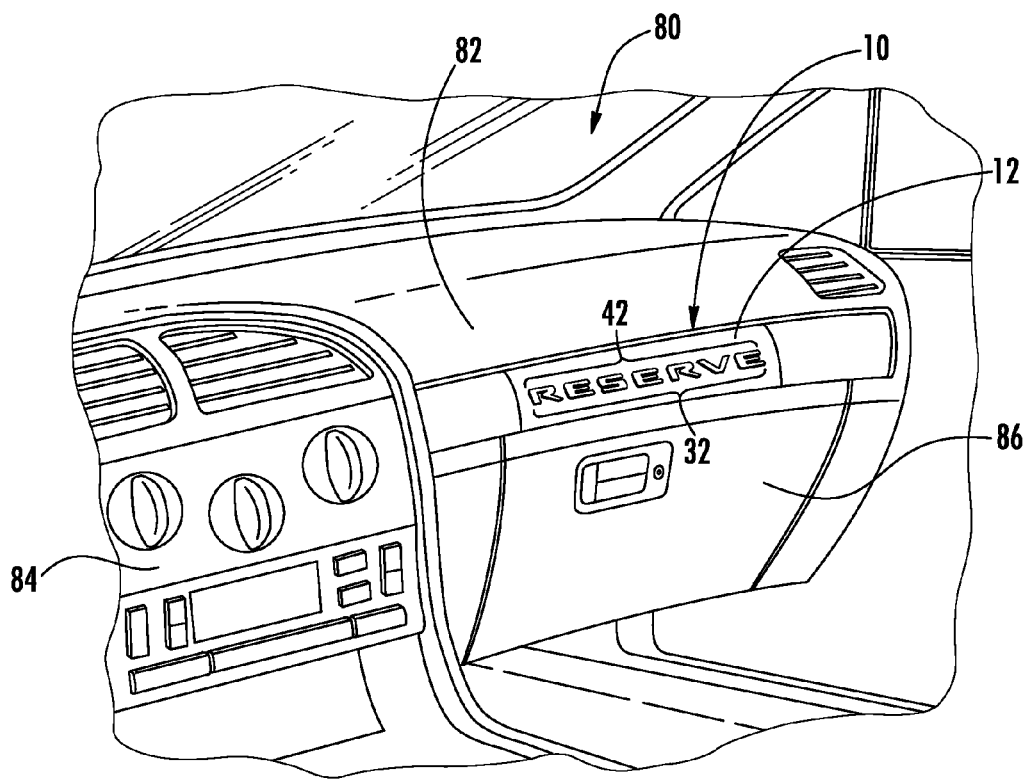
FIG. 4 is a perspective view of a vehicle interior showing the trim panel with the first and second badge plates installed in a dashboard.

Referring now to FIG. 4, a vehicle interior 80 is shown having a dashboard 82, a center console 84 and a glove box 86. Disposed above the glove box 86, trim panel 12 is disposed on the dashboard 82 with the badge 42 raised outwardly from badge relief section 32, such that, in this embodiment, the lettering of the badge 42 provides a 3-D effect for the word RESERVE extending outwardly from the outer surface 18 of the trim panel 12. In accordance with the present invention, it is contemplated that the badge plates 14, 16 and trim panel 12 can have different textures or colorations to emphasize the badge 42 as disposed on the dashboard 82. For example, the raised lettering 40a-40g of badge 42 can be plated with simulated chrome to highlight the lettering RESERVE on a black trim panel 12. Other such color schemes and texture variations are contemplated for use with the present invention for providing a desired effect for the badge mounting system 10 of the present invention.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A badge mounting system for a vehicle interior, comprising:
    a trim panel having inner and outer surfaces;
    letter shaped apertures disposed through a body portion of the trim panel;
    one or more badge plates having raised lettering outwardly extending from a backing portion of the one or more badge plates to define a badge, wherein the one or more badge plates are rear loaded to the inner surface of the trim panel, such that the badge is received in the letter shaped apertures of the trim panel;
    a plurality of mounting bosses disposed on the inner surface of the trim panel; and
    a plurality of mounting apertures disposed on the backing portion of the one or more badge plates, wherein each mounting boss of the plurality of mounting bosses is received in a corresponding mounting aperture of the plurality of mounting apertures in assembly.

2. The badge mounting system of claim 1, wherein the backing portion of the one or more badge plates includes an abutment surface configured to abut the inner surface of the trim panel in assembly.

3. The badge mounting system of claim 1, further comprising:
    a plurality of locating tabs disposed on the inner surface of the trim panel, the locating tabs extending outwardly from the inner surface; and
    a plurality of locating notches disposed on the backing portion of the one or more badge plates, wherein each locating tab of the plurality of locating tabs is received in a corresponding locating notch of the plurality of locating notches in assembly.

4. The badge mounting system of claim 1, wherein the raised lettering comprises individual letters having distal edge portions.

5. The badge mounting system of claim 4, wherein the distal edge portions of the raised lettering extend beyond the outer surface of the trim panel in assembly.

6. The badge mounting system of claim 4, wherein the distal edge portions of the raised lettering are flush with the outer surface of the trim panel in assembly.

7. The badge mounting system of claim 4, wherein the distal edge portions of the raised lettering are recessed relative to the outer surface of the trim panel in assembly.

8. A badge mounting system for a vehicle interior, comprising:
    a badge plate;
    an emblem comprised of raised lettering formed integrally on the badge plate;
    a trim panel having inner and outer surfaces;
    a badge relief section formed integrally on the trim panel and defined by letter shaped apertures, wherein the badge plate is coupled to the inner surface of the trim panel and the emblem is received in the badge relief section;
    a plurality of locating tabs disposed on the inner surface of the trim panel, the locating tabs extending outwardly from the inner surface; and
    a plurality of locating notches disposed through the badge plate, wherein each locating tab of the plurality of locating tabs is received in a corresponding locating notch of the plurality of locating notches in assembly.

9. The badge mounting system of claim 8, wherein the raised lettering comprises individual letters having distal edge portions.

10. The badge mounting system of claim 9, wherein the letter shaped apertures comprise cutout images of individual letters, the cutout images being complementary to the individual letters of the raised lettering, such that the individual letters are closely received in the badge relief section.

11. The badge mounting system of claim 10, wherein the distal edge portions of the individual letters extend beyond the outer surface of the trim panel in assembly.

12. The badge mounting system of claim 9, wherein the cutout images of individual letters define one or more lettering flange portions disposed within the badge relief section.

13. The badge mounting system of claim 12, further comprising:
    one or more reinforcement members disposed adjacent to the one or more lettering flange portions, the one or more reinforcement members extending outwardly from the inner surface of the trim panel; and
    one or more reinforcement apertures disposed through the badge plate, the one or more reinforcement apertures configured to receive the one or more reinforcement members in assembly.

14. A badge mounting system for a vehicle interior, comprising:
    a badge plate having a backing portion with a raised badge portion integrally formed thereon;
    a trim panel having inner and outer surfaces;
    a badge relief section integrally formed through the trim panel having a complementary configuration to the raised badge portion, and further configured to receive the raised badge portion when the badge plate is coupled to the inner surface of the trim panel;
    a plurality of mounting bosses disposed on the inner surface of the trim panel; and
    a plurality of mounting apertures disposed on the badge plate, wherein each mounting boss of the plurality of mounting bosses is received in a corresponding mounting aperture of the plurality of mounting apertures in assembly.

15. The badge mounting system of claim 14, wherein the raised badge portion comprises alphanumeric indicia having distal edge portions.

16. The badge mounting system of claim 15, wherein alphanumeric indicia are closely received in the badge relief section, and further wherein the distal edge portions extend outwardly beyond the outer surface of the trim panel in assembly.

* * * * *